J. F. ROBERTSON.
CHECK VALVE.
APPLICATION FILED JAN. 16, 1911.

1,049,922.

Patented Jan. 7, 1913.
2 SHEETS—SHEET 1.

WITNESSES

INVENTOR
J. F. Robertson
By
Attorneys.

J. F. ROBERTSON.
CHECK VALVE.
APPLICATION FILED JAN. 16, 1911.

1,049,922.

Patented Jan. 7, 1913.

2 SHEETS—SHEET 2.

WITNESSES
J. H. Burgess
K. H. Butler

INVENTOR
J. F. Robertson

By N. C. Evert & Co.
Attorneys.

UNITED STATES PATENT OFFICE.

JOHN F. ROBERTSON, OF PITTSBURGH, PENNSYLVANIA.

CHECK-VALVE.

1,049,922.   Specification of Letters Patent.   Patented Jan. 7, 1913.

Application filed January 16, 1911. Serial No. 602,967.

*To all whom it may concern:*

Be it known that I, JOHN F. ROBERTSON, a citizen of the United States of America, residing at Pittsburgh, in the county of Allegheny and State of Pennsylvania, have invented certain new and useful Improvements in Check-Valves, of which the following is a specification, reference being had therein to the accompanying drawing.

This invention relates to check valves, and the invention has for its object to provide a valve of the above type with novel gravity seating valvular members capable of being unseated by a head or pressure of water, steam or air, the valvular members being arranged in a manner as will be hereinafter set forth whereby they are intermittently rotated, thereby insuring an equal wear of said members and a positive seating, thus producing a valve that is positive in its action, free from injury by ordinary use and highly efficient for the purposes for which it is intended.

A further object of the invention is to provide a valve of the above type consisting of comparatively few parts, easily and quickly assembled and maintained in an operatable condition, the valve being designed upon certain lines that add individuality to the same whereby it can be readily distinguished among other valves installed upon steam, air or water lines.

With these and such other objects in view as may hereinafter appear, the invention consists of the novel construction, combination and arrangement of parts to be hereinafter specifically described and then claimed.

Reference will now be had to the drawings forming part of this specification, wherein there are illustrated the preferred embodiments of the invention, but it is to be understood that the structural elements thereof can be varied or changed without departing from the spirit and scope of the invention.

Figure 1:
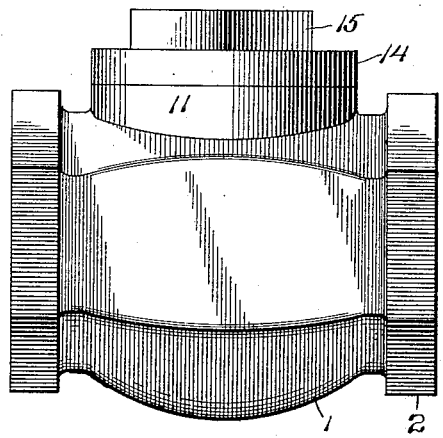
Figure 2:
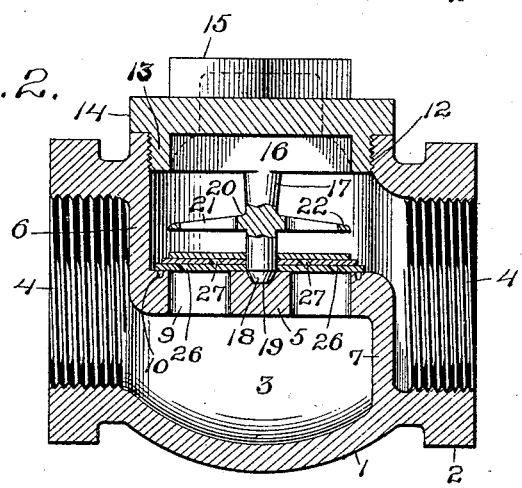
Figure 3:
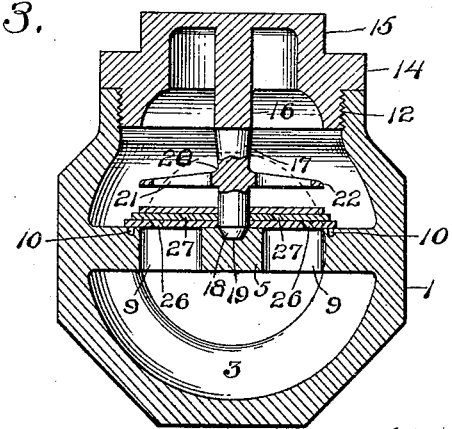
Figure 4:
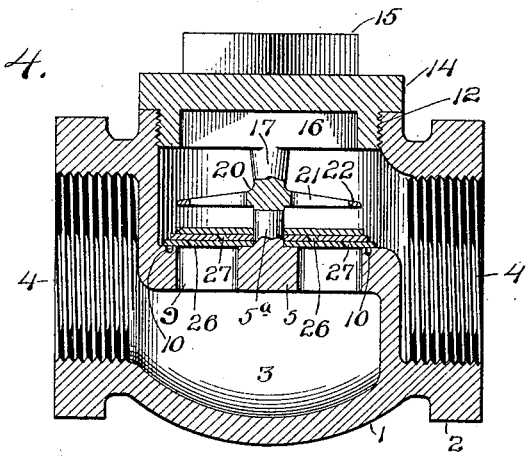
Figure 5:
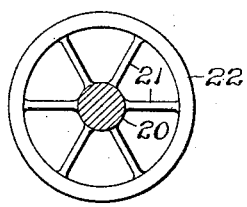
Figure 6:
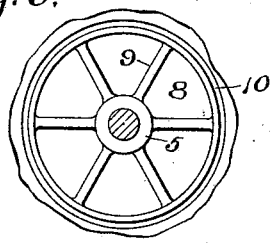
Figure 7:
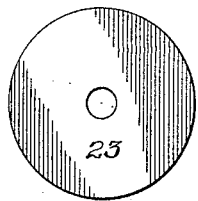
Figure 8:
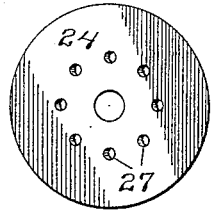
Figure 9:
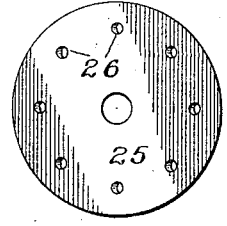
Figure 10:

In the drawings:—Figure 1 is a side elevation of a valve in accordance with this invention, Fig. 2 is a longitudinal sectional view of the same, showing the valvular members seated, Fig. 3 is a cross sectional view of the valve, Fig. 4 is a longitudinal sectional view of a modified form of valve, Fig. 5 is a horizontal sectional view of a retaining member forming part of the valve, Fig. 6 is a horizontal sectional view of a portion of a valve illustrating a seat for the valvular members, Figs. 7 to 9 inclusive are plans of the valvular members, and Fig. 10 is a cross sectional view of one of the spokes of the horizontal partition of the valve body.

Like numerals of reference designate corresponding parts throughout the several views.

1 denotes a valve body having an exterior shape hexagonal or octagonal in cross section, the ends of the body terminating in enlargements 2 of a similar shape, this particular appearance of the valve body distinguishing it from other types of valves, particularly those having globular bodies. The valve body 1 is provided with a longitudinal bore 3, the walls of said bore at the ends thereof being threaded, as at 4 whereby pipes can be connected to the valve body. The bore 3 intermediate the ends of the valve body is divided by a horizontal partition 5, one end of the partition being formed integral with the valve body by a web 6 and the opposite end by a web 7, said webs together with the partition 5 dividing the valve body into practically two compartments, the lower compartment receiving the water, steam or air and the upper compartment discharging the same. The partition 5 is provided with a plurality of segment-shaped equally spaced openings 8 leaving spokes 9 supporting the central portion of the seat, the spokes 9 constituting a web that allows the contents of the lower compartment of the valve body to pass into the upper compartment. The spider or the openings 8 are surrounded by a circumferentially arranged groove 10 formed in the upper face of the seat 5, said groove providing a water seal or connection in conjunction with certain valvular members to be hereinafter described.

The top of the valve body has an annular enlargement 11 providing an opening communicating with the upper compartment of the valve body, and the walls of the opening are threaded, as at 12 to receive the annular exteriorly threaded depending flange 13 of a hollow cap 14 adapted to seat upon the upper edges of the enlargement 11, the top of said cap having a central square or hexagon shaped nut 15 adapted to facilitate the removal of the cap 14 from the valve body. The depending flange 13 has a transverse web 16 and this web intermediate the ends thereof is provided with a depending stem 17, the lower end of which is tapered, as at 18 to engage in a socket 19 provided therefor centrally of the partition 5. The stem 17 intermediate the ends thereof has a guard or retaining member, comprising a hub portion 20, spokes 21 and a rim 22, said guard or retaining member being approximately the same diameter as the spider of the partition 5.

Surrounding the stem 17 are superimposed valvular members, consisting of disks 23, 24 and 25, the former being of a less diameter than the latter, the disks being stepped in size and arranged with the disk 25 to seat directly upon the partition 5 with the disk 24 next and the disk 23 resting upon the disk 24. The disk 25 contiguous to the periphery thereof is provided with a plurality of circumferentially arranged openings 26, these openings being drilled at an angle. The disk 24 also has angularly disposed openings 27, but the openings 27 are disposed whereby they cannot register with the openings 26, as best shown in Figs. 2 and 3 of the drawings. The openings are disposed at an angle, whereby the pressure of water, steam or air will have a tendency to rotate said disks and thereby insure an equal wear of the disks upon the partition 5 and upon one another.

When the pressure of water, steam or air in the upper compartment of the valve body is released, the pressure of the water, steam or air in the lower compartment of the body immediately elevates the disks 23 to 25 inclusive, and the upward movement of these disks are limited by the guard or retaining member of the stem 17. These disks seat by gravity, and by back pressure of air or liquids, and since the cap 14 can be easily removed, the disks can be renewed from time to time.

In Fig. 4 of the drawings there is illustrated a modification of the invention wherein the partition 5 is provided with a post 5ª over which the disks 23 to 25 are mounted, said post supporting the lower end of the stem 17, which in the modified form of construction is of less length than in the preferred form of construction. The post 5ª facilitates the placing of the valvular members in position, and the modified form of construction is the same in operation, as the preferred form of construction.

In Fig. 10 of the drawings there is illustrated a cross sectional view of one of the spokes or spider of the horizontal partition 5, and it is preferable to make these spokes with the upper and lower edges thereof reduced to deflect the water, steam or air toward the valvular members.

As will be seen, the members 23, 24 and 25 are freely movable axially on the support or stem provided by the member 17 or 5ª, said members being held to the seat by reason of the pressure on the outlet side of the valve and by gravity or the weight of the members themselves, the inlet pressure, however, being on the member 25 throughout the surface lying over the openings in the spider of the partition 5, and on the member 24 on the surface overlying the openings in the member 25. When, therefore, the pressure on the outlet side of the valve is relieved, there is a tendency for the members 24 and 23 to be slightly raised initially, thus providing sufficient fluid between the members 25 and 24 to cause the member 25, which immediately follows, to force the fluid through the openings of member 24 to cause the member 23 to be raised, the inclination of the openings causing the necessary and desired shifting movement pivotally of the members. Inasmuch as the pressure is mainly on the member 25, by reason of its relatively large exposed surface, it will be obvious that its movements will be rapid with the result that the movements of the members 24 and 23 must be made with greater rapidity for a time necessary to provide the fluid to perform the desired shifting; hence the rapid reduction in weight of the members produced by the relatively smaller diameters of the members, and the elimination of back pressure, such as would be provided by spring supports for the members, is of the greatest importance in check valve construction where the operations are required to be sudden, rapid and accurate; this will be obvious from the fact that as soon as the pressure of the inlet side is relieved by the movement of valve member 25 from its seat, the pressure on member 24 through the openings of member 25, is reduced to such an extent that substantially no action would be provided.

What I claim is:—

1. A check valve comprising a casing having an inlet and an outlet and further having an opening, a flanged cap for closing said opening and provided with a web integral with the flange, a horizontally-disposed partition arranged within said casing and providing a pair of compartments, said partition formed with a plurality of equally spaced openings, superimposed valvular members seated upon said partition and adapted to close said openings, certain of said members provided with means to cause a rotative movement thereof when shifted from said partition, a stem integral with said web and projecting through said members centrally and extending into said partition, said stem maintaining the first members in position over said partition, and laterally-extending means integral with the stem intermediate the ends thereof for limiting the opening movement of said valvular members.

2. A check valve comprising a casing having a horizontally disposed partition provided with openings, thereby forming a pair of compartments, superimposed valvular members seated upon said partition and adapted to close said opening, a cap detachably connected to the valve body, a depending stem projecting from the cap and terminating at said partition, said stem extending centrally through said members for maintaining them in position over said partition, a hub intermediate the ends of said stem, spokes projecting from said hub, a rim integral with the spokes, said hub, spokes and rim constituting a guard for limiting the opening movement of said members.

In testimony whereof I affix my signature in the presence of two witnesses.

JOHN F. ROBERTSON.

Witnesses:
 A. KALBACK,
 MAX H. SROLOVITZ.